United States Patent [19]

Milstein

[11] Patent Number: 4,782,448
[45] Date of Patent: Nov. 1, 1988

[54] CONTRACT ESTIMATING SYSTEM UTILIZING A DIGITIZING RULER

[75] Inventor: Irving Milstein, Margate, N.J.

[73] Assignee: Judith Titton, Margate, N.J.

[21] Appl. No.: 49,259

[22] Filed: May 13, 1987

Related U.S. Application Data

[63] Continuation-in-part of Ser. No. 784,338, Oct. 4, 1985, Pat. No. 4,744,034.

[51] Int. Cl.$^4$ .......................... G06F 15/20; G06F 15/60
[52] U.S. Cl. ................... 364/464.01; 33/1 G; 33/566; 235/70 A; 235/385; 235/495; 364/403; 364/562; 364/709.11
[58] Field of Search ............... 364/401, 403, 409, 464, 364/518, 709, 561, 562; 235/462, 472, 484, 495, 383, 385, 70 A; 33/1 AA, 1 G, 1 L, 432, 436, 476, 529, 562, 566, 571, 572

[56] References Cited

U.S. PATENT DOCUMENTS

| | | | |
|---|---|---|---|
| 3,238,501 | 3/1966 | Mak et al. | 235/472 |
| 3,859,632 | 1/1975 | Etter | 235/472 |
| 4,009,339 | 2/1977 | Anderson et al. | 364/561 |
| 4,095,273 | 6/1978 | Gonzalez | 364/561 |
| 4,158,229 | 6/1979 | Woo, Jr. et al. | 364/562 |
| 4,255,653 | 3/1981 | Borkat et al. | 235/487 |
| 4,323,773 | 4/1982 | Carpenter | 235/462 |
| 4,337,375 | 6/1982 | Freeman | 235/462 |
| 4,383,298 | 5/1983 | Huff et al. | 364/464 |
| 4,390,778 | 6/1983 | Toivonen | 235/89 R |
| 4,481,412 | 11/1984 | Fields | 235/462 |
| 4,521,678 | 6/1985 | Winter | 235/462 |
| 4,578,768 | 3/1986 | Racine | 364/464 |
| 4,656,591 | 4/1987 | Goldberg | 364/478 |

Primary Examiner—Parshotam S. Lall
Assistant Examiner—Kevin J. Teska
Attorney, Agent, or Firm—Norman E. Lehrer

[57] ABSTRACT

A contract estimating system includes a digitizer ruler divided into a plurality of equally spaced increments. The ruler generates an output signal representing the distance along the ruler at a point touched by a hand held probe. A digitizer board carries a menu thereon including a plurality of indicia such as words, pictures and numbers representing different component parts and sizes and scale factors and generates an output signal corresponding to one of the indicia when touched by the probe. A computer automatically counts the number of each size component part and calculates the total length of pipes and similar components measured by the ruler. The results calculated by the computer can be displayed on a CRT and/or printed on a printer.

2 Claims, 2 Drawing Sheets

CONTRACT ESTIMATING SYSTEM UTILIZING A DIGITIZING RULER

CROSS-REFERENCE TO RELATED APPLICATION

This application is a continuation-in-part of prior application Ser. No. 784,338, filed Oct. 4, 1985, now U.S. Pat. No. 4,744,034.

BACKGROUND OF THE INVENTION

The present invention is directed toward a contract estimating system and more particularly toward such a system which utilizes a digitizer ruler and a digitizer board for measuring and counting the various construction components and a computer for accumulating the information.

In the building construction trades there is the necessity to provide accurate estimates of the cost of construction for use in competitive bidding. An accurate cost estimate must take into account the costs of a vast multitude of structural, plumbing, electrical, heating and other types of purchased equipment and components. Preparing accurate estimates has, in the past, been a time consuming and expensive task. This difficulty has been aggravated in recent years by the manyfold increase in the types and sizes of equipment used in modern construction and by rapidly changing prices.

Computers have been utilized in recent years to store and process the voluminous data required in the preparation of cost estimates. Such computers can easily store the pertinent data concerning the wide range of equipment from manufacturers catalogs and provide ready access to the information on demand. Furthermore, the mathematical operations required in producing a tabulation of all of the equipment for a large construction job together with any desired cost breakdown of the materials can easily be performed by the computer.

Nevertheless, human operators are required to load the data from the architect's drawings into the computer so that it may produce the desired cost estimate. The estimator must work from blueprints or drawings and insert quantity data for each type of equipment or component involved. For example, the operator, through the use of a keyboard or the like, manually inserts data relating to the number of feet of electrical conduit, the number of feet of pipe or the total number of pipe fittings of any given type and size, etc. In determining the number of feet of conduit or pipe or the like, the estimator normally utilizes a ruler to measure the component on the architect's drawing and feeds this measurement into the computer which, utilizing a scale factor, converts this measurement into the proper number of feet. The scale factor is selected by the estimator based on the drawing scale factor and is programmed into the computer.

Devices have been proposed in the past for assisting an estimator in measuring the length of conduit or pipe or the like on a drawing. These devices utilize a hand held probe which includes a small wheel mounted at the lower end thereof. The wheel is rolled along the length of line on the drawing and an electrical signal is generated which is dependent on the number of rotations of the wheel and which, therefore, represents the length of the line. This electrical signal can be fed into a calculator or computer which can be used to assist the estimator in accumulating the data and preparing a bid. Examples of such devices are shown in U.S. Pat. Nos. 3,497,959; 4,009,339; and 4,383,301.

While such devices may be of some benefit to the estimator, they fall short of being significant help. Initially, it is noted that such devices rely on friction between the wheel or roller and the drawing. If there is any slippage, an inaccurate measurement will be made. Thus, the estimator must work relatively slowly to ensure that the device is making proper contact with the drawing at all time. Furthermore, such devices can only be utilized to measure lengths of pipe or conduit or the like. They cannot be utilized to count the number of pipe fittings and numerous other components used in construction. While other input devices such as keyboards or other types of buttons can be utilized to input data relating to these various other types of components and data relating to scale factors and component sizes and the like, this greatly increases the cost and complexity of such a system thereby making it more difficult and costly for an estimator to utilize. Also, when keyboard entries are made, the chance of human error is more likely.

In Applicant's prior application Ser. No. 784,338, a system is described which utilizes a hand held probe to feed all of the relevant necessary information into the computer. The system includes a ruler divided into a plurality of equally spaced increments each of which is marked by a machine readable bar code. When the ruler is placed on a drawing, the length of a component can be measured and fed into the computer by scanning one of the ruler bar codes with the probe. A menu is also provided which includes a plurality of bar codes representing different component parts and sizes and a plurality of scale factors. While Applicant's prior system has advantages over the prior art, it also has limitations since the bar codes on the ruler cannot be placed too close together or they become too small to read with the sensor.

U.S. Pat. No. 4,578,768 describes a computer-aided digitizing system for use by an estimator which does not utilize bar codes. This system requires, however, that the plan or blueprint be small enough to be placed on a surface thereof. Thus, the system cannot be used with larger prints.

SUMMARY OF THE INVENTION

The present invention is designed to overcome all of the problems of the prior art described above. It also utilizes a single hand held probe which can easily and quickly feed all of the necessary information to the computer so that the computer can store and process all of the necessary data to prepare a cost estimate. The contract estimating system of the invention includes a digitizer ruler divided into a plurality of equally spaced increments. The ruler generates an output signal representing the distance along the ruler at a point touched by a hand held probe. A digitizer board carries a menu thereon including a plurality of indicia such as words, pictures and numbers representing different component parts and sizes and scale factors and generates an output signal corresponding to one of the indicia when touched by the probe. A computer automatically counts the number of each size component part and calculates the total length of pipes and similar components measured by the ruler. The results calculated by the computer can be displayed on a CRT and/or printed on a printer.

BRIEF DESCRIPTION OF THE DRAWING

For the purpose of illustrating the invention, there is shown in the accompanying drawing one form which is presently preferred; it being understood that the invention is not intended to be limited to the precise arrangements and instrumentalities shown.

DETAILED DESCRIPTION OF THE PREFERRED EMBODIMENT

Figure 1:
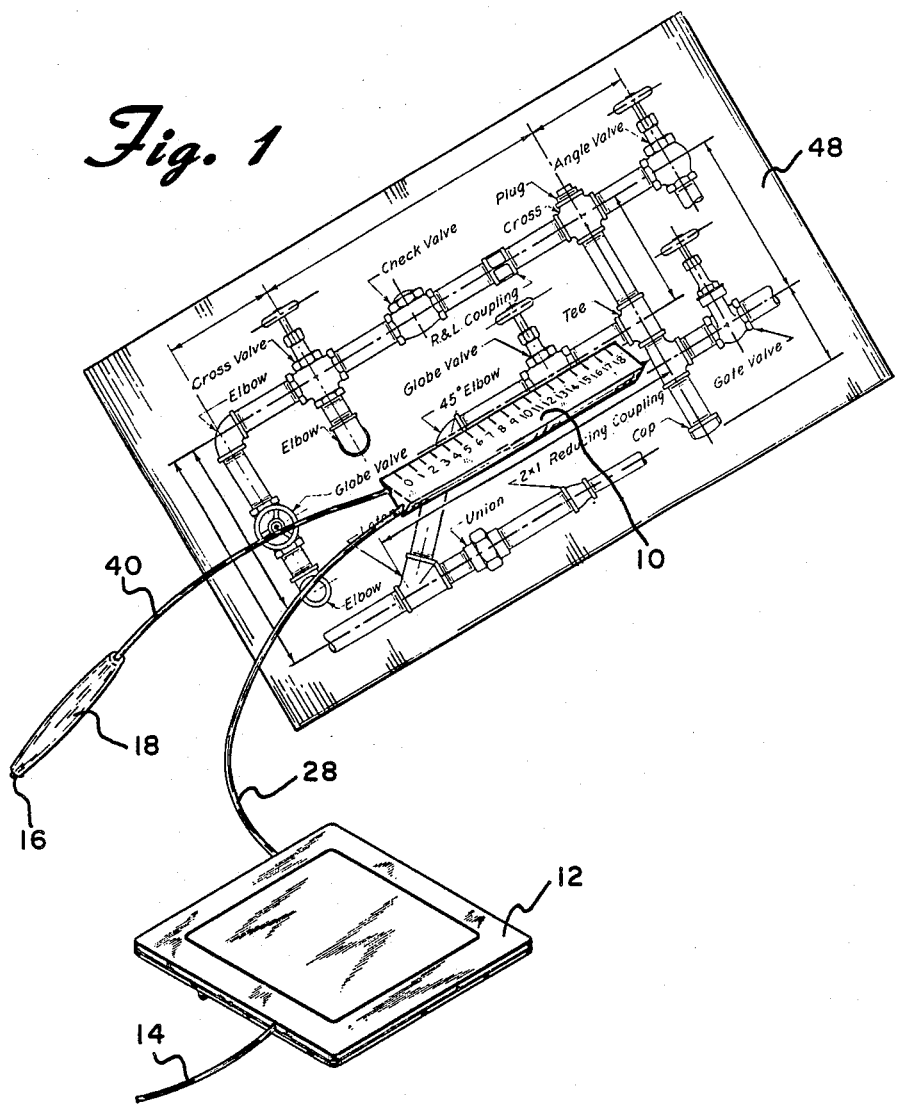
FIG. 1 is a perspective view of the major component parts of the contract estimating system constructed in accordance with the principles of the present invention and shown being utilized with a blueprint.

Referring now to the drawings in detail wherein like reference numerals have been used throughout the various figures to designate like elements, there is shown in FIG. 1 a perspective view of a digitizing ruler 10 and a digitizer board 12 which are utilized as part of the contract estimating system of the present invention. The digitizer board 12 is well known, per se, and is readily available from such companies as Summagraphics Corporation of Fairfield, Conn. As is well known in the art, the digitizer board 12 generates an output signal on line 14 which represents the exact position along the X and Y coordinates of the surface of the digitizer board 12 that is touched by the tip 16 of the hand held probe 18. The operation and construction of digitizer boards are well known and examples can be found in U.S. Pat. Nos. 3,846,580; 3,904,821; 4,018,989; 4,081,603; 4,368,351; 4,368,352; 4,482,784 and 4,514,688.

Figure 2:
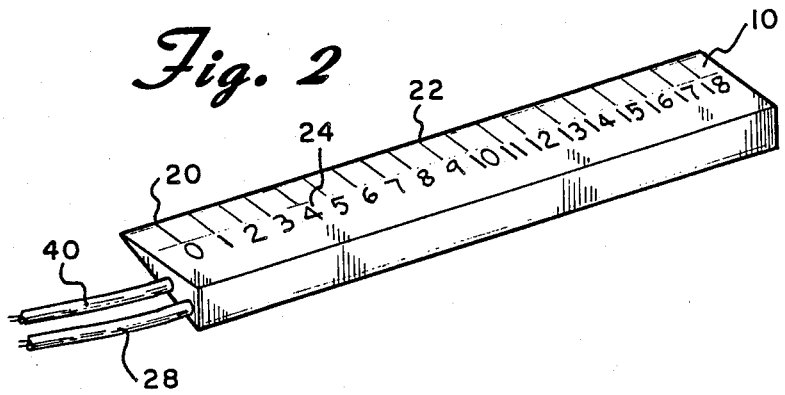
FIG. 2 is a perspective view of a digitizing ruler utilized with the invention.

The digitizing ruler 10 has an outer appearance which is similar to a conventional ruler. It is an elongated substantially thin ruler having a length which is substantially longer than its width. As shown in FIG. 2, at least a substantial portion of the ruler 10 is divided into a plurality of equally spaced increments such as shown 20 and 22. Each increment may have a number or other indicia such as shown at 24 thereon in order to give the user an idea of the relative distances along the ruler.

Figure 4:
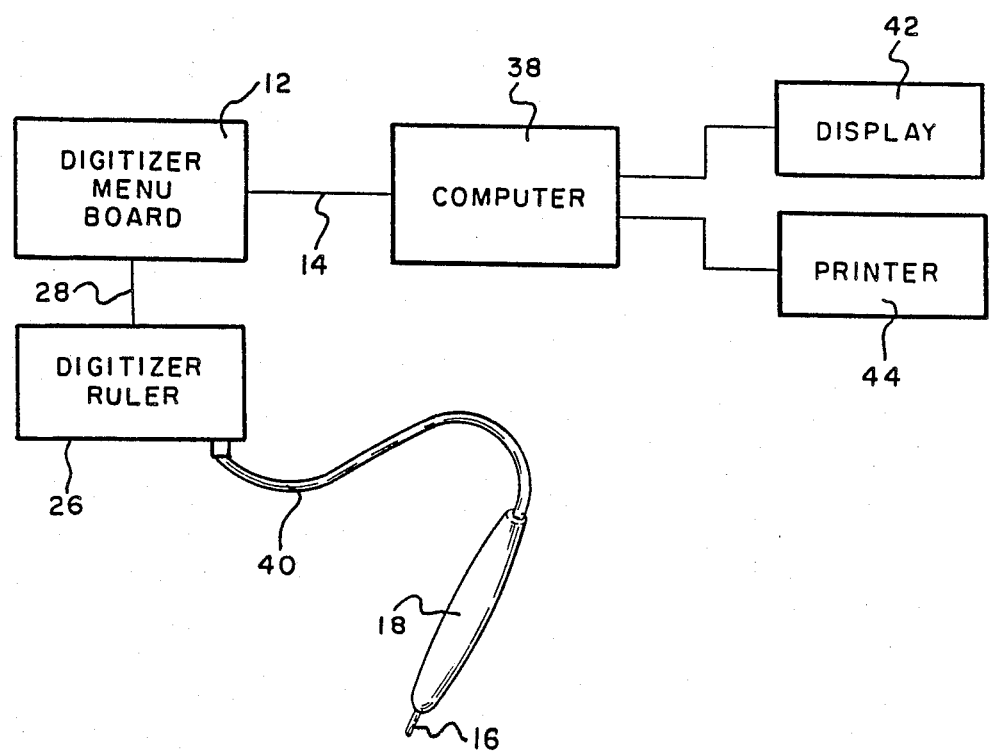
FIG. 4 is a schematic representation shown primarily in block form of an overall contract estimating system utilizing a digitizing ruler.

Within the digitizing ruler 10 is a digitizer circuit shown diagrammatically in FIG. 4 as 26. The digitizer circuit 26 is constructed in a manner very similar to the circuit within the digitizer board 12 and may be constructed in accordance with one of the digitizer patents set forth above. However, the digitizer circuit 26 within the ruler 10 need generate an output signal representing the X coordinate only. Thus, the digitizer circuit 26 will generate an output signal on output line 28 indicative of the distance along the ruler at the point touched by the probe 18.

Figure 3:
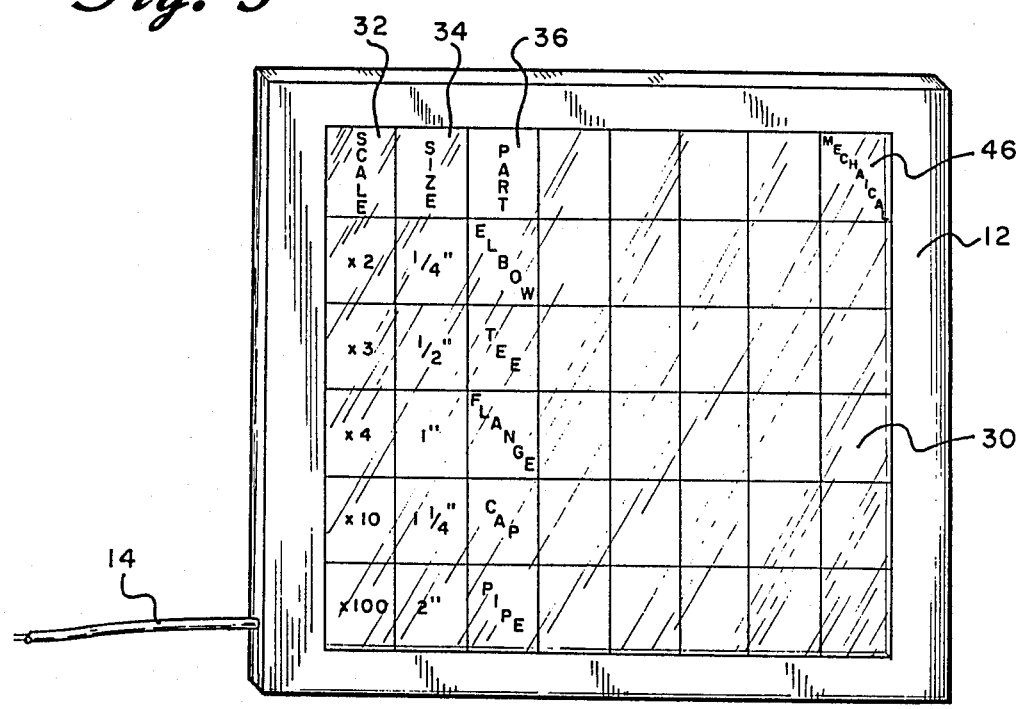
FIG. 3 is a perspective view of a digitizer board with a menu thereon utilized with the invention.

While the purpose of the digitizing ruler 10 is to generate an output signal indicative of a measured length, the digitizer board 12 is more concerned with selecting a particular component to be measured or counted, a component size or for selecting a scale factor or the like. For this reason, a menu such as shown at 30 in FIG. 3 is placed on the surface of the digitizer board 12. The menu is divided into a plurality of rows and columns. Column 32 may, for example, list a plurality of scale factors thereunder; Column 34 identifies a plurality of different size components and Column 36 includes a plurality of different component parts. Obviously, other scale factors, sizes and parts may be utilized. Furthermore, depending on the nature of the job to be estimated, other categories of items may be included. For this reason, the menu 30 is made to be removable so that it can be replaced by another menu.

In addition to providing information concerning the various component parts and lengths, etc., the menu 30 could also include various spaces which identify various operations or instructions for the computer 38 to be discussed below. For example, the menu may include spaces which may be touched by the hand held probe 18 which instruct the computer to add, subtract, cancel, display, print or the like.

The computer system utilized with the present invention is shown diagrammatically in FIG. 4. As shown therein, the probe 18 is connected to the digitizer menu board 12 through input line 40. The digitizer board 12 is, in turn, connected to the output of the digitizer ruler 26 through line 28. Since the hand held probe 18 interacts with both the digitizer board 12 and the ruler 26, it could be connected to either of these two components. The output 14 of the digitizer board 12 is connected to the input of a general purpose computer 38. Computer 38 may be substantially any type of general purpose home or business computer. Connected to the computer 38 is a monitor such as a cathode-ray tube display 42 so that the estimator utilizing the system can monitor the information being fed into and processed by the computer. A hard copy of the data processed by the computer 38 or the final estimate or breakdown thereof can be obtained through printer 44.

The contract estimating system of the present invention is utilized in the following manner. If the estimator is first going to prepare an estimate for the mechanical system of the building, he selects the proper mechanical menu such as menu 30. The operator then touches the tip 16 of probe 18 to the space 46 on the menu 30 which, through the digitizer board 12, informs the computer 38 that it is the mechanical system being worked on. The estimator may first wish to count all elbow joints of a given size. He selects the size by touching the proper space in Column 34 such as the two-inch space with the probe 18. Thereafter, while examining the drawing, the estimator, with the probe 18, will touch the tip 16 thereof on the elbow section in Column 36 each time he sees a two-inch elbow on the drawing. All of this information will be accumulated by the computer 38 and will be displayed on the display monitor 42.

When it is desired to measure a total length of pipe or the like, the proper scale factor is selected based on the scale to which the drawing is made. For example, the estimator will touch the scale factor X10 with the probe 18 to advise the computer that a scale factor of 10 is being selected. The probe is then touched to the two-inch section of digitizer board 12 in Column 34 and to the pipe section in Column 36 to advise the computer that pipe is to be measured and that the two-inch size is selected. The computer 38 is now prepared to receive information concerning the length of two-inch pipe. At this point, the digitizer ruler 10 is placed on the drawing 48 as shown in FIG. 1 with the zero or initial part of the ruler at the beginning of the pipe. The probe 18 is then used to touch the ruler along the length thereof at the end of the pipe being measured. The information concerning the length of this pipe is generated by the digitizer ruler 10 and this information is transferred to the computer 38 through lines 28 and 14. The computer 38 calculates the actual pipe length utilizing the selected scale factor.

As should be readily apparent to those skilled in the art, the computer 38 may be programmed so that it can accumulate all of the incoming data and perform whatever operations are needed with respect to the same. For example, each time a length of a pipe of a particular size is inputted, the computer will add this length to the already accumulated amount to provide a total length of pipe of each size. The cost of each component part by piece and by size can also be stored in the computer and the same can be programmed to calculate the total cost of the equipment utilizing this stored information. The printer 44 can print out all of the final cost breakdowns calculated by the computer.

The present invention can be embodied in other specific forms without departing from the spirit or essential attributes thereof and accordingly, reference should be made to the appended claims rather than to the foregoing specification as indicating the scope of the invention. By way of example and not limitation, although the digitizer ruler 10 is shown connected to the digitizer board 12 through line 28, it may be possible to transfer the information by way of a wireless radio frequency signal. Thus, a transmitter could be contained within the ruler 10 and an appropriate receiver could be contained within the digitizer board 12 or could otherwise be connected to the computer 38. This will allow the ruler 10 to be more easily and freely moved on the blueprint 48 or on various other drawing plans without the need of a connection to the remaining components of the system.

I claim:

1. A contract estimating system comprising:
   an elongated substantially thin ruler having a length which is substantially longer than its width, at least a substantial portion of said ruler being divided into a plurality of equally spaced increments;
   a digitizer circuit within said ruler;
   a hand held probe connected to said digitizer circuit;
   said digitizer circuit generating an output signal indicative of the distance along said ruler touched by said probe;
   a digitizer board connected to said ruler digitizer circuit, said digitizer board having an upper surface with a menu thereon including a plurality of indicia, some of said indicia representing different types of materials or construction components and some of said indicia representing different sizes of components, said digitizer board generating an output signal representing one of said indicia touched by said probe;
   computer means having an input receiving information from said ruler digitizer circuit and said digitizer board, said computer means being capable of identifying a signal from said ruler and said board as a component identification, a component size or a length and including means for separately accumulating information concerning each type and size component, and
   means for displaying the information accumulated by said computer means.

2. The invention as claimed in claim 1 wherein some of said indicia represent scale factors and wherein said computer means adjusts all numbers read from said ruler by the scale factor selected by said probe touching one of said scale factor indicia.

* * * * *